Nov. 17, 1925.
A. BOAS
1,561,529
DRIVING ARRANGEMENT FOR ROLLING MILLS OR FOR THE MECHANICAL TRANSMISSION OF POWER FROM ELECTRIC MOTORS
Filed Jan. 3, 1924
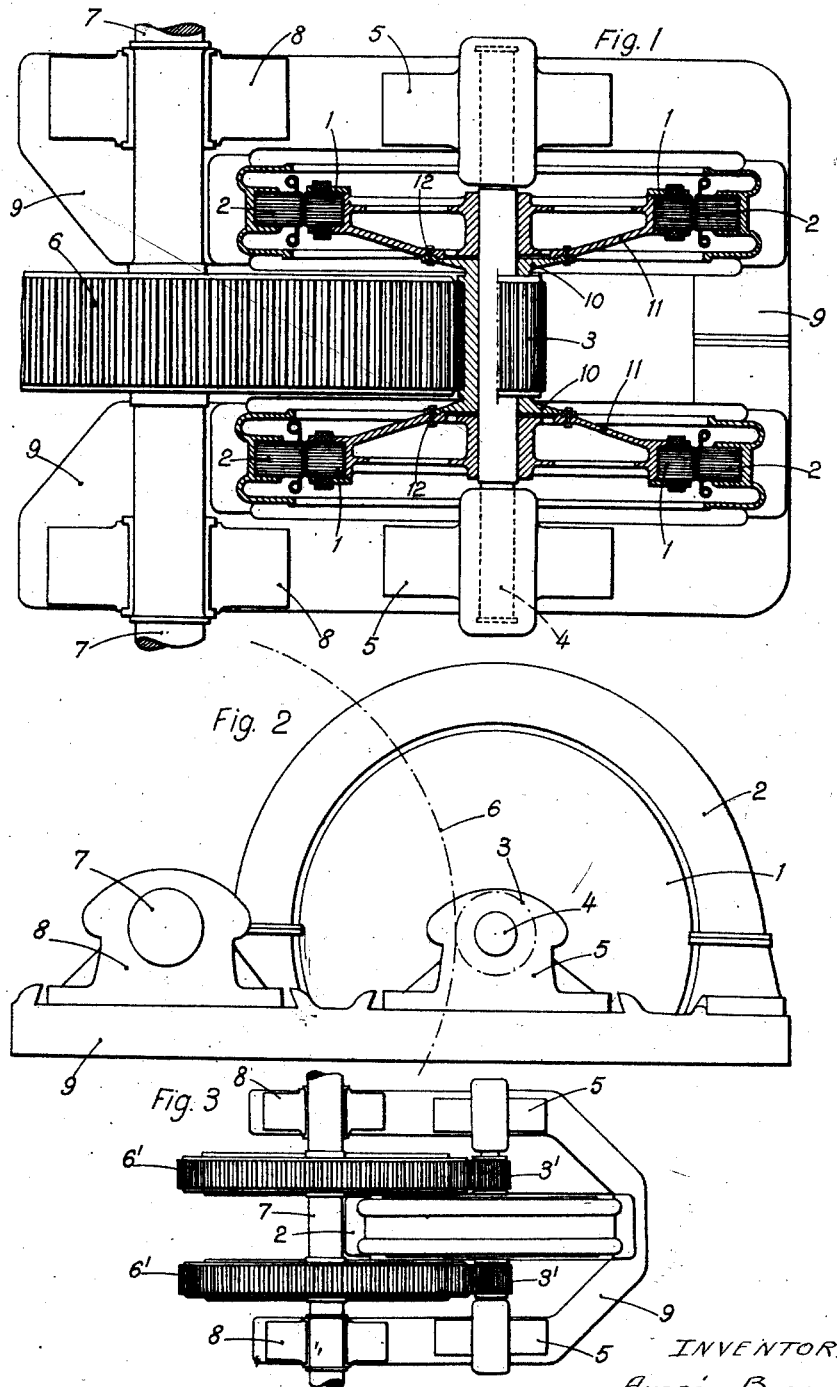
INVENTOR.
ANDRÉ BOAS.
By O'Neill and Bunn
ATTORNEYS.

Patented Nov. 17, 1925.

1,561,529

UNITED STATES PATENT OFFICE.

ANDRÉ BOAS, OF PARIS, FRANCE, ASSIGNOR TO SOCIÉTÉ ANONYME DES ENGRENAGES CITROEN, OF PARIS, FRANCE, A CORPORATION OF FRANCE.

DRIVING ARRANGEMENT FOR ROLLING MILLS OR FOR THE MECHANICAL TRANSMISSION OF POWER FROM ELECTRIC MOTORS.

Application filed January 3, 1924. Serial No. 684,244.

*To all whom it may concern:*

Be it known that I, ANDRÉ BOAS, citizen of the French Republic, residing at Paris, Department of the Seine, in France, and having P. O. address 31 Quai de Grenelle, in the said city, have invented certain new and useful Improvements in Driving Arrangements for Rolling Mills or for the Mechanical Transmission of Power from Electric Motors; and I do hereby declare the following to be a full, clear, and exact description of the invention, such as will enable others skilled in the art to which it appertains to make and use the same.

The present invention relates to certain driving arrangements for rolling mills or for the mechanical transmission of power, having the same characteristics which eliminate to a considerable extent the difficulties of effecting such transmission when derived from electric motors.

The actual conditions of the art may be fairly resumed as follows:—

When the rolling mills, for example, are to be driven by electric motors, one is compelled either to have recourse to direct drive by a motor the number of revolutions of which corresponds to that of the rolling mill and the price of which is extremely high, or to employ a motor capable of rotating at normal speed for its power and for a normal price, which motor is utilized to drive the shaft of the rolling mill by means of one or more than one train of gearing. By reason of the irregularity of the work required which changes suddenly from zero to a very considerable maximum a fly wheel is always necessary so as to obtain considerable economy if the rolling mill be not reversible. This fly wheel can be placed either on the shaft of the rolling mill or on that of the motor which rotates at high speed. In this latter arrangement a considerable amount of energy is accumulated with a lighter fly wheel. But the load on the shaft bearings of the motor and of the fly wheel then increases and the design of these bearings offers considerable difficulty when the speed of the motor is great by reason of the co-relative increase in the co-efficient of friction. One is therefore compelled in the choice of the motor speed to prefer a motor which by reason of its number of revolutions will be economical without, however, considering the maximum of economy in the sale price of the motor.

In the construction of electric motors, the value of the linear speed to the induction plays, as is well known, an important function. When the motor is of relatively slight dimensions and power it is quite possible to adopt moderately high linear speeds, the laminations of the rotor being in one piece and secured directly on the shaft. But when the dimensions of the motor increase the linear speed is limited by the effect of the centrifugal force acting on the sheet metal segments and on the rigid windings of the rotor.

The object of the present invention consists in utilizing this fact with a view of an economical construction for driving a rolling mill, the arrangement being such that the rotor itself serves as the fly wheel. The motor of which the rotor then forms the fly wheel is analogous in its general arrangement to fly wheel alternators which have been heretofore constructed with the view of direct coupling with steam engines at constant speed. That is to say, the induction surface is a cylinder of large diameter and of slight thickness. In these machines the linear speed relatively to the induction was relatively slight, the necessities of transport limiting the diameter. But if the number of revolutions is not fixed by that of the steam engine the linear speed relatively to the induction and consequently the inertia of the motor can be considerably increased because the parts which serve to secure the laminations are attached very close to the induction surface and thus increase the moment of inertia. At the same time the space occupied by the fly wheel forming rotor in the direction of the length of the shaft is no greater than that which it would have occupied as a separate and distinct fly wheel and consequently the flexure of the shaft can be great. Finally, the direct connection of the rotor to the first pinion of the train of gearing which is disposed adjacent thereto has the advantage of saving the shaft from all fatigue due to torsion. Further, a symmetrical arrangement of the installation ensures the absolute equality in value and in direction of the load on the bearings.

The accompanying Figures 1 to 3 shewn diagrammatically relate to a sheet metal rolling mill, for example, and indicate:

Figure 1 shews a plan partly in section of an installation comprising a driving arrangement in accordance with the present invention, the rolling mill being driven by two electric motors.

Figure 2 is an elevation of Figure 1.

Figure 3 is a sectional plan of a modified installation in accordance with the invention in which a single electric motor is used.

Referring to Figures 1 and 2, the rotors of the two motors are indicated at 1, the said rotors being situated one on each side of a pinion 3. 2 indicates the stators of the two motors. The shaft of the two motors is indicated at 4, the said shaft being also common to the pinion 3. The bearings of the shaft 4 are indicated at 5, 5, and 6 is a gear wheel driven by the pinion 3. The shaft 7 of the gear wheel 6 is connected to the rolling mill by couplings. 8, 8 are the bearings for the shaft 7. The base plate 9 carries the four bearings 5, 5, 8, 8 and the stators 2, 2.

The pinion 3 is provided with end flanges 10, 10 on which are fixed the rotor discs 11, 11 by means of bolts 12, the pitch circle and the number of which are sufficient to afford perfect safety coupled with the addition of rings or keys. In this manner, the driving of the pinion is effected mainly by these bolts from both sides of the pinion instead of being effected by a key on the shaft acting on a small diameter and subjecting the shaft to torsion.

Referring now to the modification shewn in Figure 3, it is here supposed that in place of a single pinion and one motor there are two pinions as shewn at 3', 3' each driving a wheel 6' keyed on the shaft 7 of a train of rolling mills, there being shewn only a single motor of which the rotor forming a fly wheel is placed at the centre. The connection of each of the pinions 3', 3' and the rotor is effected in the same manner as in the arrangement shewn in Figure 1. The other parts are the same and bear the same reference numerals as Figures 1 and 2. As will be readily seen from an examination of Figure 3, symmetry is again realized in this arrangement and consequently the bearings under all conditions are subjected to equal loads.

On the drawings there is shewn trains of gearing having straight teeth but double helical, herringbone or other suitable gearing could also be employed.

It will be obvious to any expert in the art to which the invention relates that the application of the present invention, which is specially applicable in the case of the driving of rolling mills, could also be used in all cases for the transmission of power from an electric motor to a shaft which is to be rotated at reduced speed and on which the resistant couple is subjected to considerable and continual variations, whether of a periodic or aperiodic nature and which usually require the addition of a regulating fly wheel of which the mass according to the present invention would conflict with that of the rotor of the motor.

What I claim is:

1. The combination of an electric motor having its rotor revolubly mounted on a stationary shaft and serving as a fly wheel, a pinion revoluble on said shaft, flanged connections between said rotor and said pinion, and a driven gear meshing with said pinion.

2. The combination of two electric motors having their rotors revolubly mounted in spaced relation on a stationary shaft and serving as fly wheels, a pinion revolubly mounted on said shaft between said rotors, flanged connections between said pinion and said rotors, and a driven gear meshing with said pinion.

In testimony whereof I affix my signature.

ANDRÉ BOAS.